Patented May 27, 1941

2,243,477

UNITED STATES PATENT OFFICE 2,243,477

INSECTICIDAL PROCESS

William F. Hester, Drexel Hill, Pa., assignor to Röhm & Haas Company, Philadelphia, Pa.

No Drawing. Application July 19, 1938, Serial No. 220,003

2 Claims. (Cl. 167—30)

This invention relates to insecticidal compositions, and particularly to the use of benzyl sulfide as the active principle thereof.

The object of the invention is to provide improved insecticidal compositions of general application which can be used in low concentrations to control pests without injury to the plant foliage. A further object is to provide an organic insecticide of the agricultural contact type to be used particularly against red spiders (Araneida).

The phenyl ethers and benzyl ethers have heretofore been proposed as insecticidal principles. However, they have never been used extensively for the purpose because of their relatively low toxicity as compared to other known insecticidal principles, and because of the severe plant injury that results from their use in sufficient quantities to be effective against insects. It has now been found, however, that benzyl sulfide shows high toxicity to red spiders when used in a concentration so low the foliage of the plant is not harmed.

Benzyl sulfide may be made by many known methods. Two such methods are reacting benzyl mercaptan with benzyl chloride in the presence of alkali, and the reacting of benzyl chloride and sodium sulfide in alcoholic solution. (Shriner, Struck, Jorison, Journ. Amer. Chem. Soc. 52, 2066 (1930).)

In practicing the invention the benzyl sulfide may be applied as a dust or as a spray, in which the active ingredient varies from 0.05 to 5% of the total. The dusts are readily prepared by dissolving the sulfide in a suitable solvent, such as acetone, mixing the proper amount of solution with an inert powdered substance, such as talc. lime, etc., and drying while stirring the powder.

Sprays used to kill sucking insects, such as red spiders, by contact, can be made by dissolving the active ingredients in an organic liquid that does not affect the foliage, adding an emulsifying agent, and dispersing the solution in sufficient water to reduce the concentration of active ingredient to the desired point. A suitable formula for this type of spray is—

| | Parts |
|---|---|
| Benzyl sulfide | 0.25 |
| Emulsifying agent | 0.25 |
| Pine oil | 0.50 |
| Water | 100–300 |

A spray used to combat flying insects, such as flies, mosquitoes, etc., or crawling insects, such as roaches, lice, etc. can be made by merely dissolving the proper amount of active ingredient, 1–5%, in an organic solvent, such as kerosene, to which an auxiliary solvent or spreading agent may be added, if desired.

The new insecticide is particularly valuable in controlling red spiders. When sprayed at a concentration of one part benzyl sulfide emulsified in 1200 parts of water on rose bushes infested with red spiders, ten different tests showed an average kill of 94% after twenty-four hours, with no injury to the foliage. This is a considerably higher percent kill than was obtained with some commercial products used in dilution of 1 to 100 parts water.

The benzyl sulfide may be used as the sole toxic ingredient in the insecticidal composition or there may be mixed with it other known insecticidal principles, such as the thiocyanates, rotenone, derris, cube root, and the phenyl benzyl ethers.

I claim:

1. The process of controlling infestations of red spiders on plants which comprises applying to the infested plants a spray containing benzyl sulfide.

2. The process of controlling infestations of red spiders on plants which comprises treating the infested plants with an emulsion containing approximately one part of benzyl sulfide to 1200 parts of water.

WILLIAM F. HESTER.